United States Patent [19]

Richoux

[11] Patent Number: 4,690,014

[45] Date of Patent: Sep. 1, 1987

[54] FLEXIBLE-TUBE DEVICE FOR TRANSMITTING LONGITUDINAL FORCES

[76] Inventor: Raymond Richoux, ISPE 40600 Biscarrosse, France

[21] Appl. No.: 804,785

[22] Filed: Dec. 5, 1985

[30] Foreign Application Priority Data

Dec. 14, 1984 [FR] France .................................. 84 19126

[51] Int. Cl.$^4$ .................................................. F16C 1/10
[52] U.S. Cl. ..................................... 74/501 R; 74/502
[58] Field of Search .............. 74/501 R, 501 A, 501 B, 74/501 C, 501 D, 501 E, 501 F, 502, 503

[56] References Cited

U.S. PATENT DOCUMENTS

| 421,587 | 2/1890 | Krell | 74/502 |
|---|---|---|---|
| 1,035,849 | 8/1912 | Bergens | 74/502 |
| 2,090,207 | 8/1937 | Kliesrath | 74/502 |
| 2,378,655 | 6/1945 | Popp | 74/502 |
| 2,457,910 | 1/1949 | McLaren et al. | 74/502 |
| 2,772,573 | 12/1956 | Thomas | 74/502 |
| 2,841,029 | 7/1958 | Richoux | 74/502 |
| 2,845,813 | 8/1958 | Richoux | 74/501 A |
| 2,869,377 | 1/1959 | Pieterse | 74/502 |
| 3,154,966 | 11/1964 | Bratz | 74/501 C |
| 3,593,588 | 7/1971 | Hulse | 74/502 |
| 3,841,171 | 10/1974 | Young, Jr. | 74/501 C |
| 3,945,268 | 3/1976 | Ion et al. | 74/501 C |
| 4,062,251 | 12/1977 | Parsons | 74/501 C |
| 4,074,463 | 2/1978 | Colanzi | 74/501 A |
| 4,075,905 | 2/1978 | Schaaphok | 74/501 R |
| 4,133,222 | 1/1979 | Dooley | 74/501 C |
| 4,188,835 | 2/1980 | Ion | 74/502 |

FOREIGN PATENT DOCUMENTS

| 114597 | 8/1984 | European Pat. Off. | 74/501 C |
|---|---|---|---|
| 610080 | 3/1935 | Fed. Rep. of Germany | 74/502 |
| 871065 | 4/1942 | France | 74/501 C |
| 1124613 | 4/1955 | France | 74/501 C |
| 1212730 | 3/1958 | France | 74/501 C |
| 1410294 | 7/1964 | France | 74/501 C |
| 2285538 | 4/1976 | France | 74/501 C |
| 90045 | 7/1957 | Norway | 74/502.3 |

Primary Examiner—Gary L. Smith
Assistant Examiner—Vinh Luong
Attorney, Agent, or Firm—Wegner & Bretschneider

[57] ABSTRACT

In a flexible-tube device for transmitting longitudinal forces, a flexible core strip is guided within a flexible tubular sheath by two rows of ball-bearings. The balls of the first row roll on a flat metallic rail applied against the tubular sheath while the balls of the second row roll directly on the internal surface of the sheath.

7 Claims, 8 Drawing Figures

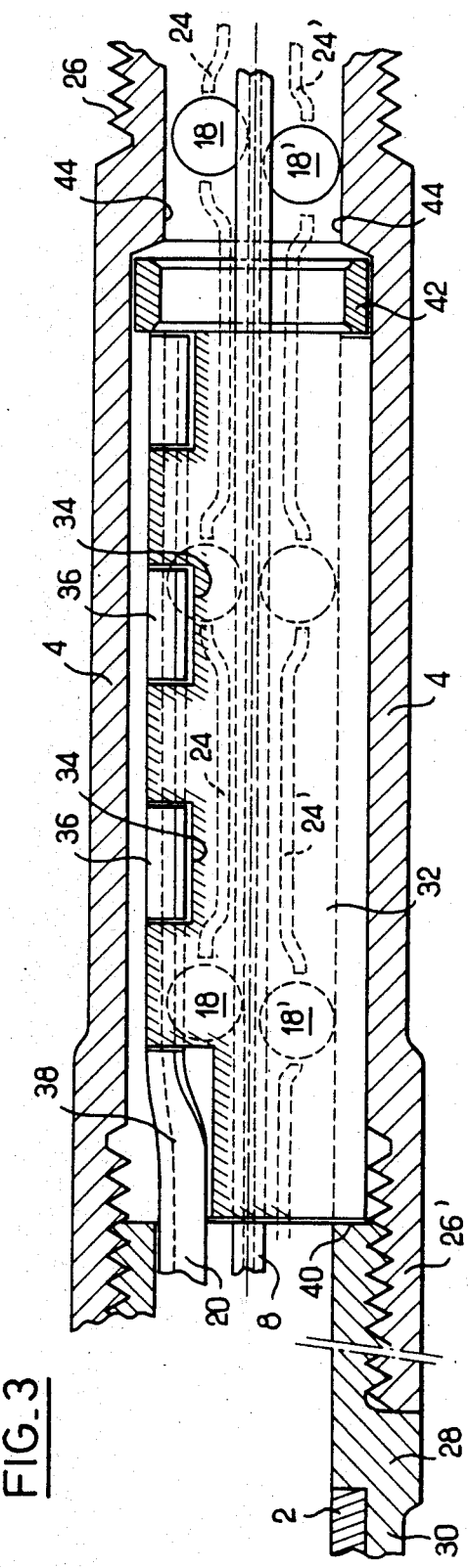
FIG_3
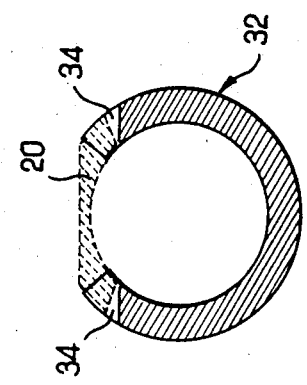
FIG_5
FIG_4

FLEXIBLE-TUBE DEVICE FOR TRANSMITTING LONGITUDINAL FORCES

BACKGROUND OF THE INVENTION

1. Field of the Invention

The present invention relates to flexible-tube devices of the "push-pull" cable type for the transmission of tractive forces and/or compressive forces. A device of this type consists of a flexible tubular casing or sheath which has a circular cross-section and is formed of either metal or plastic material. A flat and flexible central member usually formed of high-strength stainless steel and designated as a core strip is placed in the axis of the tubular sheath. The function of the core strip is to transmit forces as it moves axially with respect to the stationary sheath between two rows of ball-bearings which are guided within ball-races cut in both faces of the core strip.

The balls which roll in contact with the core strip are held at a fixed distance from each other by means of a ball-bearing retainer cage usually consisting of a flat strip provided with uniformly spaced holes for receiving the balls.

2. Description of the Prior Art

In a known form of construction (as described in French patent No. 1,124,613 filed on Apr. 8th 1955 in the name of the same inventor), the two rows of ball-bearings are adapted to move on the one hand in ball-races cut in both faces of the core strip and, on the other hand, in the ball-races formed in two stationary oppositely-facing flexible outer strips. These flat race strips are usually formed of stainless steel and applied against the circular internal face of the tubular sheath.

In known transmission devices of this type, the two ends of both outer race strips are engaged and locked with terminal collars, said collars being in turn secured to the frame of the machine on which the transmission device is mounted whilst the two ends of the core strip are rigidly fixed respectively to two sliding rods mounted in the axis of said terminal collars and coupled respectively to the actuating elements or elements to be actuated.

The transmission assembly which is formed of flat strips can assume a curved or sinuous configuration by virtue of the fact that the retaining means provided for the race strips and the core strip are capable of self-orientation by rotating about the axis of the terminal collars with a view to ensuring that the plane containing the two rows of ball-bearings is located in the plane of the curve of the flexible sheath as described in French patent No. 1,212,730 filed on Mar. 25th 1958 in the name of the same inventor.

In another known design such as the assembly described in French patent No. 1,410,294 filed on July 27th 1964 in the name of the same inventor, the two rows of balls retained by the cage strips roll on the one hand in raceways cut in both faces of the core strip and, on the other hand, directly against the internal face of the flexible tubular sheath. Said sheath is so designed as to have on the one hand an internal surface having the function of a raceway which is suited for the balls and on the other hand a sufficient degree of mechanical strength to withstand the various stresses to which the sheath may be subjected, namely compressive stresses, tensile stresses and bending stresses.

In consequence, ball-bearing transmission systems of the known push-pull cable type either comprise two outer ball-race strips or else are not provided with any outer race strip when the ball-bearings roll directly in the tubular sheath. Up to the present time, the structure of all known ball-bearing transmission systems has therefore been perfectly symmetrical with respect to a mid-plane which passes through the core strip. In point of fact, this symmetrical structure has always seemed both logical and indispensable for a flexible transmission system.

The two known solutions (with two outer ball-race strips or with no outer strip) are both attended by advantages as well as disadvantages from the point of view of bulk, cost price, forces to be transmitted, and so on.

SUMMARY OF THE INVENTION

The object of the present invention is to provide a new and novel ball-bearing transmission system which embodies a number of the advantages offered by the two known designs while avoiding the disadvantages attached to these designs.

In accordance with the invention, the first row of ball-bearings is adapted to roll on the one hand in the raceway cut in the core strip and on the other hand in a flat metallic rail applied against the internal face of the tubular sheath whilst the second row of ball-bearings is adapted to roll on the one hand in the second raceway cut in the opposite face of the core strip and on the other hand directly on the internal surface of the tubular sheath.

In accordance with the invention, the ball-bearing transmission device therefore comprises only one outer ball-race strip which will hereinafter be designated as the rail. In other words, the device has a structure which is dissymmetrical with respect to a plane passing through the mid-plane of the core strip, in contradistinction to the known transmission systems of the push-pull cable type proposed up to the present time.

In accordance with another distinctive feature, the rail-retaining member or retaining sleeve which is capable of rotational displacement within the terminal collar as stated earlier in order to permit free orientation of the tubular sheath is constituted in accordance with the invention by an open-tube member so designed that the edges of the longitudinal opening of said member are provided with teeth for receiving and securing the rail, said rail being in turn provided with notched edges for receiving the teeth of the edges of said retaining sleeve.

The internal diameter of said retaining sleeve is the same as that of the flexible tubular sheath and therefore leaves the same free cross-sectional area above and beneath the core strip, with the result that the ball-bearings and cage strips can continue to travel through said retaining sleeve. This possibility was not provided, however, in the rail-retaining systems known heretofore such as the system disclosed, for example, in French patent No. 1,212,730 cited earlier.

A number of significant advantages result from this arrangement as well as the reduction in internal diameter of the tubular sheath achieved by elimination of one outer race strip. Such advantages include removal of any further danger of buckling of the rail (outer race strip) and of the core strip, reduction in the length of tubular sheath in which no ball-bearings are provided at the end of travel, reduction in length of terminal collars, reduction in bulk of the actuating means in respect of a predetermined force to be transmitted.

BRIEF DESCRIPTION OF THE DRAWINGS

Other features of the invention will be more apparent to those skilled in the art upon consideration of the following description and accompanying drawings, wherein:

FIG. 3 is a longitudinal sectional view of the device showing the end-collar and the rotatable rail-retaining sleeve;

FIG. 4 is a side view of the retaining sleeve;

FIG. 5 is a transverse sectional view to a larger scale and showing the same end-collar;

DETAILED DESCRIPTION OF THE INVENTION

Figure 1:
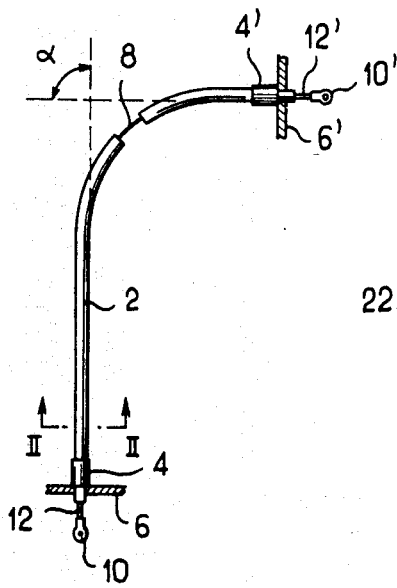
FIG. 1 is a schematic presentation of a complete ball-bearing transmission device in accordance with the invention.

The device shown in FIG. 1 comprises a tubular sheath 2, two end-collars 4-4' which fit tightly around the sheath and serve to attach this latter to two portions 6-6' of the frame of the machine, a central core 8 guided by two sets of ball-bearings (not shown in FIG. 1) and two actuating (driving or receiving) members 10-10' attached to the ends of the core strip 8 by means of two cylindrical rods 12-12' which are mounted for axial sliding motion and pivotal motion within said end-collars.

The tubular sheath 2 can be made either of plastic material having the characteristics of hardness and elasticity which are described in French patent No. 1,410,294 cited earlier, or of wire having a flat cross-section and helically wound in accordance with known principles which offer a sufficiently smooth internal surface. In the case of a flat-section wire, the tubular sheath 2 can be covered with an outer jacket or tube 14 of plastic material.

The central core 8 is a flexible flat strip of high-strength stainless steel, a groove forming a raceway 16-16' being cut in each face of the core strip for the two rows of ball-bearings 18-18'.

Figure 2:
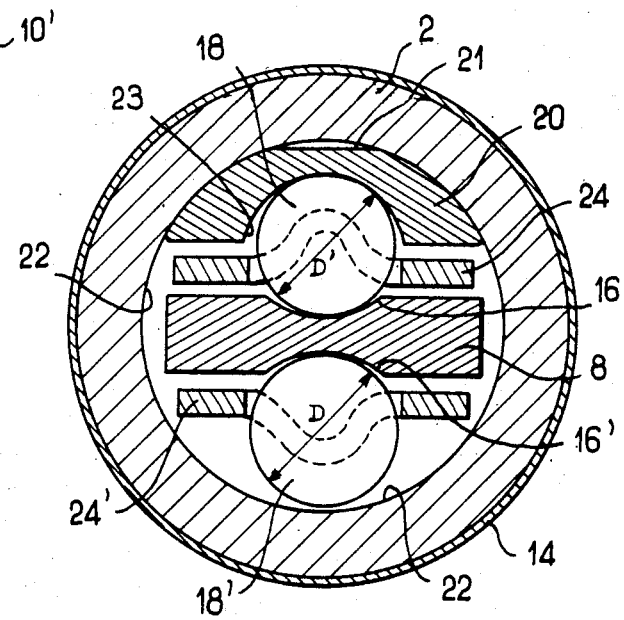
FIG. 2 is a sectional view of the device to a larger scale and taken along line II—II of FIG. 1.
Figure 7:
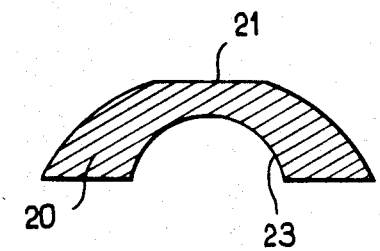
FIGS. 7 and 8 are sectional views of the guide rail taken respectively along the planes VII and VIII of FIG. 6.

The balls 18 of the first row of ball-bearings run on a stationary and flexible outer ball-race strip or so-called rail 20 which is also of stainless steel, said flexible rail being applied against the internal circular-section face 22 of the tubular sheath 2. Said flexible rail has a flattened shape as shown in FIGS. 2 and 7 (with a flat portion 21 in the portion of arcuate cross-section which is applied against the sheath) and is provided with a groove 23 or outer ball-race for the ball-bearings 18.

Between the opposite faces of the core strip 8 and the rail 20, a ball cage or so-called cage strip 24 has the function of maintaining the balls 18 in uniformly spaced relation.

The balls of the second row of ball-bearings 18' roll directly on the internal face 22 of the tubular sheath 2, the relative spacing of the balls 18' being maintained by a second cage strip 24' placed between the second face of the core strip 8 and the internal surface of the sheath.

The two ends of the single rail 20 are respectively anchored in a sleeve which is keyed axially within the end-collars 4-4' and is rotatably fitted within said collars so that the complete transmission device formed of flat strips is capable of assuming a curved or sinuous configuration by virtue of the fact that the means employed for retaining the rail and the core strip are capable of self-orientation as a result of rotational displacement about the axis of the end-collars in such a manner as to ensure that the plane containing the two rows of ball-bearings 18-18' is located in the plane of the curve of the flexible sheath.

Figure 6:
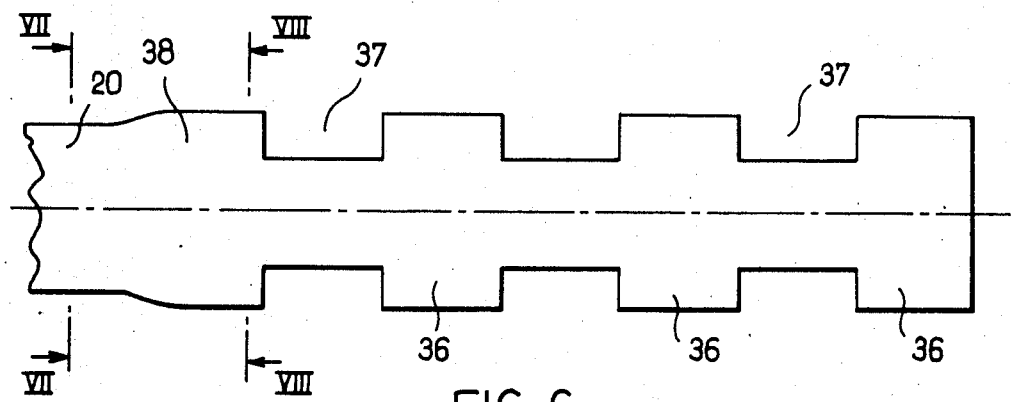
FIG. 6 is a plan view of the end portion of the guide rail showing the locking recesses in the rail-retaining sleeve.

The aforementioned sleeve for retaining the rail 20 will hereinafter be described in detail with reference to FIGS. 4, 5 and 6.

It is clearly apparent from the foregoing that the transmission device has a dissymmetrical structure with respect to the mid-plane, the core strip being substantially maintained in this plane by ensuring that the diameter of the balls D which are intended to roll on the internal wall of the tubular sheath 2 is slightly larger than the diameter D' of the balls located between the rail and the core strip.

In the transmission device according to the invention, the internal diameter of the tubular sheath 2 is reduced with respect to known two-rail transmission devices by reason of the fact that one rail (outer race strip) has been dispensed with, thereby reducing the external diameter of the tubular sheath.

In addition to a reduction in sheath diameters which, for a given value of transmitted force, is conducive to lighter construction both of the tubular sheath and of the end-collars of the transmission device, to minimum bulk and to much greater flexibility, the "monorail" ball-bearing transmission device has yet another significant advantage over conventional transmission devices having two outer race strips in which the respective distances between the points of end engagement of the race strips vary with the angle α (see FIG. 1) made between the end-collars 4-4'.

This drawback usually entails the need to allow the end portion of one of the outer race strips to remain engaged with more or less substantial longitudinal play whilst the other outer race strip alone withstands longitudinal forces when the type of transmission device in use is provided with two outer ball-race strips.

The device in accordance with the invention therefore makes it possible to simplify the constructional design with respect to the two-strip transmission systems in which at least one of the outer race strips has been anchored in the sleeve with a certain degree of axial play so as to permit different elongations of the two race strips as a result of the final change in direction of the end-collars, namely as a result of the angle α between the collars.

In the case of the monorail system in accordance with the invention, the single rail is positively anchored at each end in a sleeve which is free to rotate within the corresponding end-collar as will hereinafter be explained with reference to FIGS. 3 to 6.

There is shown in FIG. 3 a tubular end-collar 4, one threaded end 26 of which serves to fix said end-collar in the stationary frame 6 of the machine (FIG. 1). The other threaded end portion 26' of said end-collar is adapted to receive a ferrule 28, said ferrule being provided with a skirt 30 which is tightly applied against the flexible sheath 2. There is also shown the core strip 8, the single rail 20, the two sets of ball-bearings 18–18' and the two cage strips 24–24'.

The rotatable sleeve for locking engagement with the rail 20 is constituted at each end of the flexible sheath by a tube 32 which is split over a predetermined distance 1 (FIG. 5) and provided with a plurality of recesses 34 in each edge of the slit. At the time of assembly of the end-collars, said recesses 34 are adapted to receive locking teeth 36 formed between notches 37 at the edge of the rail 20 within the internal space of the cylindrical sleeve.

Figure 8:
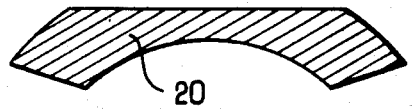

As a result of a slight transverse change in level from the zone 38 along the length of the sleeve 32 and a deformation which gives the rail 20 a cylindrical shape corresponding to the diameters of the sleeve, said rail is adapted to the aforesaid locking engagement in a tubular sleeve 32 having a diameter which is smaller than that of the tubular sheath 2. The deformed cross-section of the rail 20 over a distance corresponding to the length of the sleeve is shown in FIG. 8.

The sleeve 32 is maintained axially within the end-collar 4 by applying one end of said sleeve against the end face 40 of the collar ferrule 28 whilst the other end is applied against a ring 42 inserted in the end-collar.

The sleeve 32 is thus free to rotate within the end-collar 4 together with the rail 20 which is retained by said sleeve.

It is thus apparent that locking engagement of the rail 20 within the sleeve 32 is a positive engagement without longitudinal play.

By virtue of the locking system which leaves the necessary free space above and beneath the core strip 8 and by virtue of the fact that the internal diameter of the sleeve 32 is identical with that of the tubular sheath, the range of travel of the ball-bearings 18–18' and cage strips 24–24' can continue within the retaining sleeve, which was not the case with the known locking systems.

Finally, the displacement of the balls and cage strips can continue within the bore 44 of the threaded portion 26 of the end-collar 4. To this end, the diameter chosen for said bore can be equal to the internal diameter of the flexible sheath.

In the reverse movement, the sliding rod 12 of the actuating member is capable of penetrating into the interior of the rail-retaining sleeve, which will constitute the end of travel of said rod.

By means of the device under consideration, the length of the end-collars can be reduced to the lowest possible value.

The fact that the cage strips are permitted to pass through the rail-retaining sleeve and to penetrate into the bore of the sliding rod is attended by the following consequences:

(1) On the one hand in the event of transmission of a tractive force to the sliding rod, the rail in compression is never subjected to buckling stresses since in all positions it is continuously supported by the cage strip.

(2) On the other hand in the event of a compressive force, the core strip can be deprived of the guiding action of the ball-bearings only over a half-distance of travel whereas it is guided to a sufficient extent within the bore of the end-collar.

What is claimed is:

1. A flexible-tube device for transmitting longitudinal forces which comprises a flexible tubular sheath having a circular cross-section, a flat and flexible core strip placed within the sheath, a first row of balls rolling in a first ball-race cut in a first face of the core strip, a second row of balls rolling in a second ball-race cut in the second core-strip face opposite to the first; first and second cage strips for retaining the balls; a single metallic rail having a ball-race groove for the balls only of the first row of balls, said rail being applied against the internal surface of the tubular sheath; wherein the balls of the second row of balls roll directly on the internal surface of said tubular sheath and wherein said tubular sheath has a smooth internal surface which serves as a ball-race for said balls of said second row of balls; and the ends of said metallic rail being anchored in sleeve means.

2. A device according to claim 1, wherein the balls of the second row of balls have a slightly larger diameter than the balls of the first row for maintaining the core strip in the axis of the tubular sheath.

3. A device according to claim 1, wherein the single rail has a flattened profile which permits flexibility of said rail in the same plane as the core strip.

4. A device according to claim 1 further comprising a tubular endcollar at each end of the flexible sheath, said sleeve means being rotatably mounted within said end-collar and keyed axially within the same, said sleeve means being a tubular sleeve split in the longitudinal direction, a plurality of recesses being formed in the edges of said sleeve, and wherein the edges of the end portion of the rail are provided with teeth adapted to engage in said recesses.

5. A device according to claim 4, wherein the internal diameter of the retaining sleeve is substantially equal to the internal diameter of the tubular sheath so that the balls and cage strips can consequently penetrate through the end-collar into the interior of said sleeve.

6. A device according to claim 5, wherein the endcollar is provided at the end remote from the tubular sheath with a bore substantially equal in diameter to said sheath, the balls and the cage strips being consequently capable of penetrating up to said end portion of the end-collar, thus reducing the length of the endcollars to the minimum value which can be achieved in this type of transmission device.

7. A device according to claim 5, wherein the profile of the rail in its zone of engagement with the sleeve is slightly flattened with respect to the profile of the remainder of the rail within the tubular sheath.

* * * * *